March 15, 1927. 1,621,182
R. R. WEAVER
TANK EQUIPPED VEHICLE
Filed Aug. 20, 1926 3 Sheets-Sheet 1
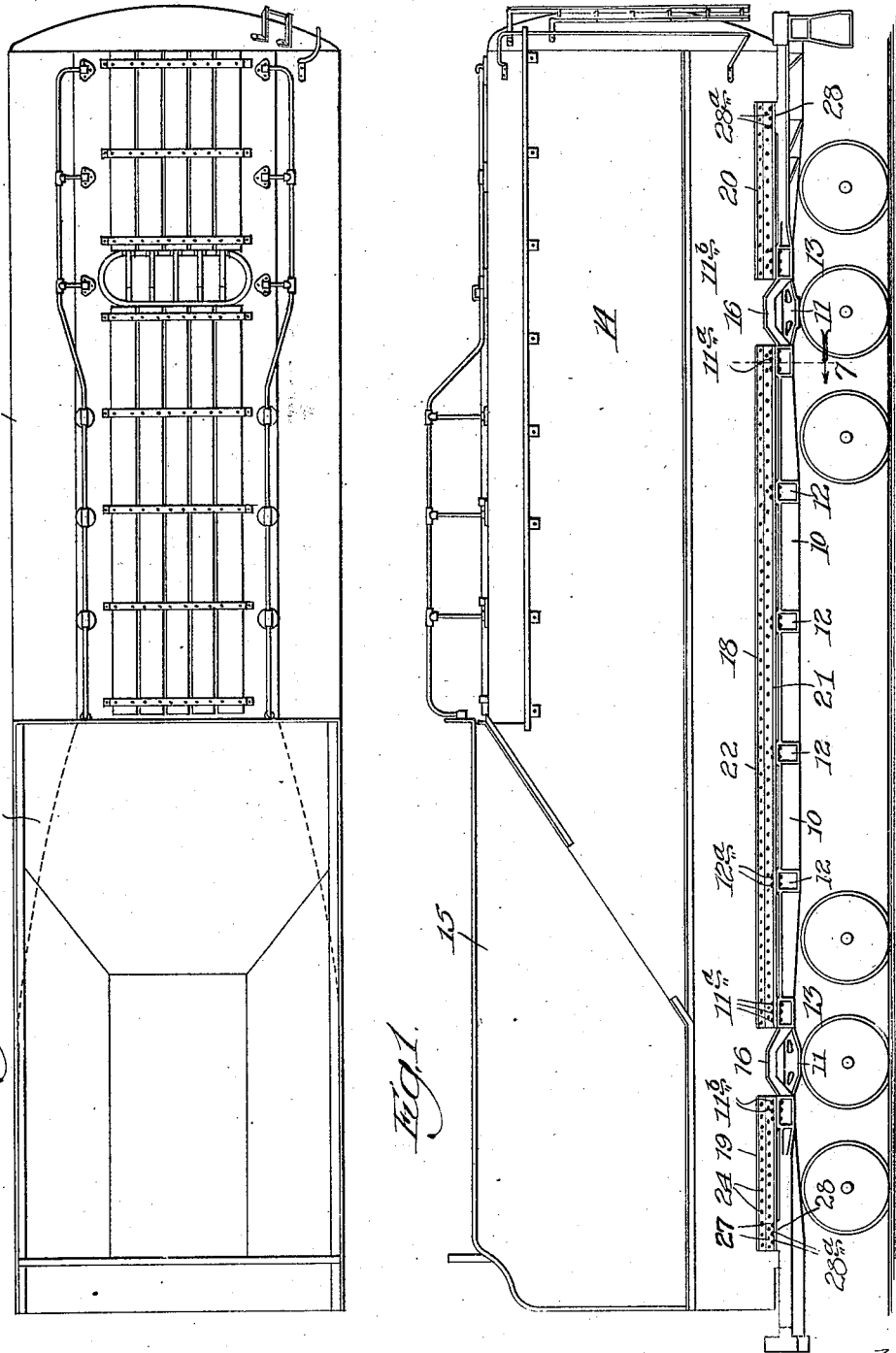

March 15, 1927.  R. R. WEAVER  1,621,182
TANK EQUIPPED VEHICLE
Filed Aug. 20, 1926  3 Sheets-Sheet 2
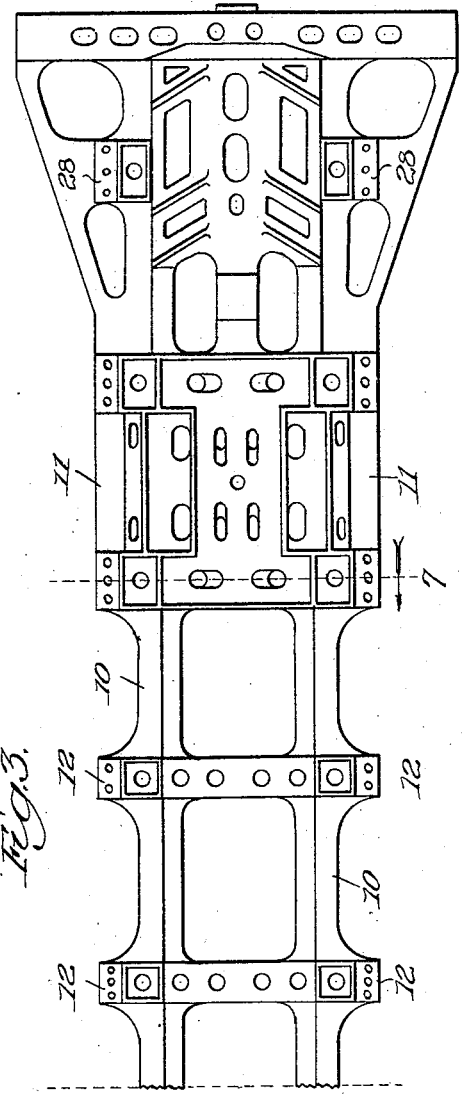
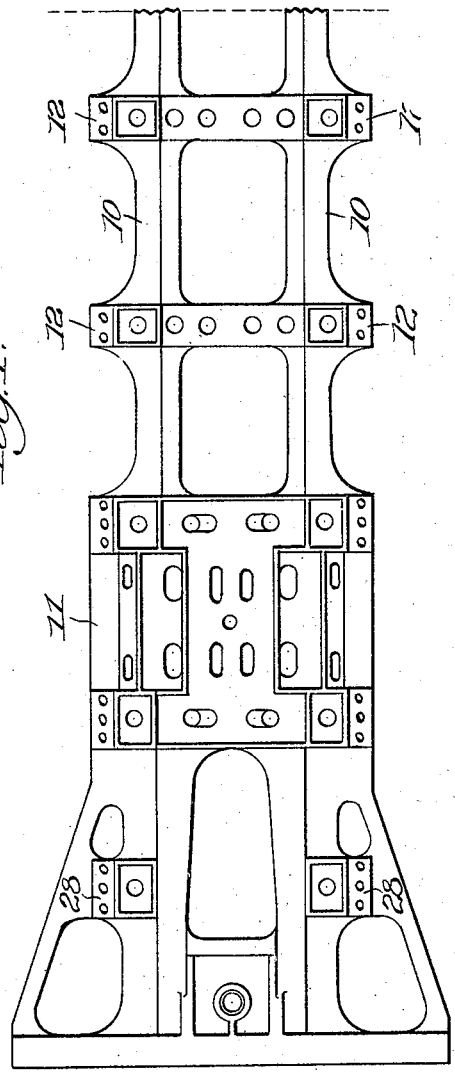
Inventor:
Robert R. Weaver,

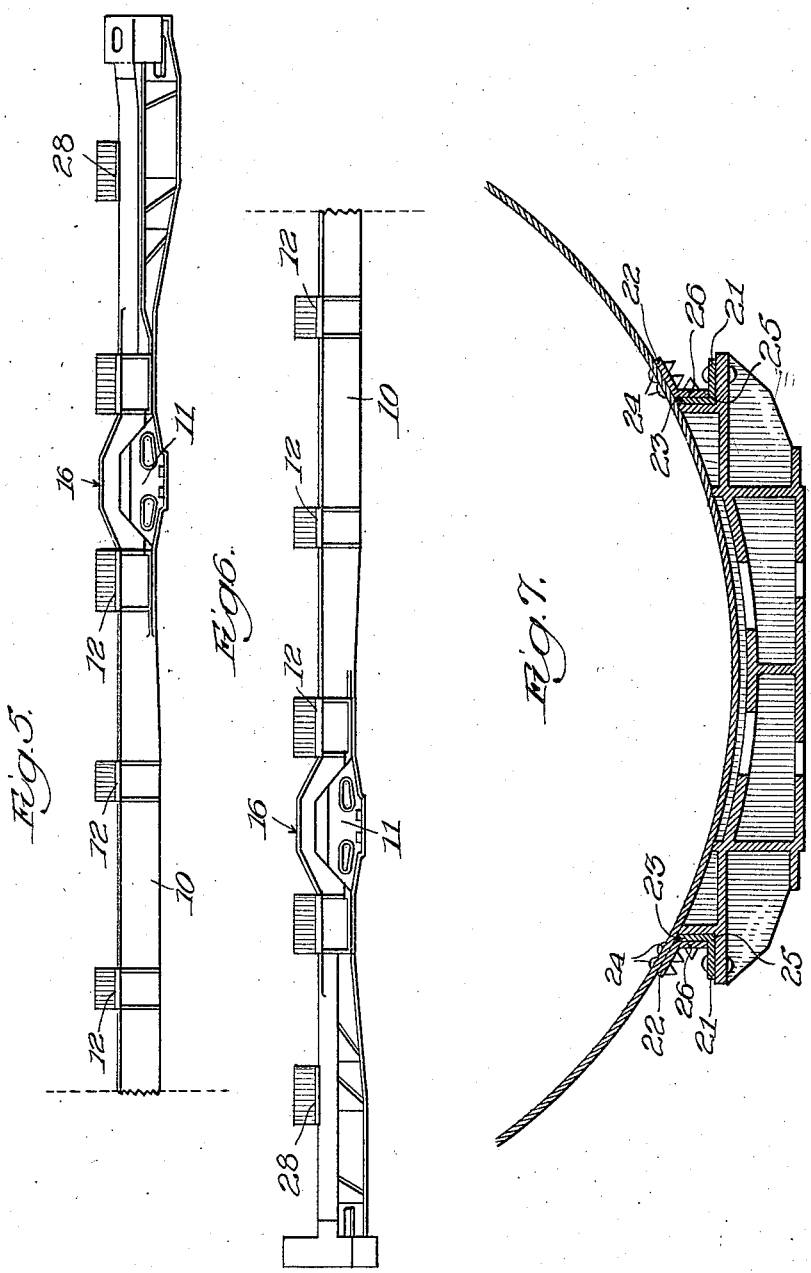

Patented Mar. 15, 1927.

1,621,182

UNITED STATES PATENT OFFICE.

ROBERT R. WEAVER, OF CHICAGO, ILLINOIS, ASSIGNOR TO GENERAL AMERICAN TANK CAR CORPORATION, A CORPORATION OF WEST VIRGINIA.

TANK-EQUIPPED VEHICLE.

Application filed August 20, 1926. Serial No. 130,455.

My invention relates to tank-equipped vehicles, such as tank cars and combined tender and tank cars; and especially to vehicles of the type in which the connections between the underframes and the tanks are remote from the longitudinal axes of the tanks.

My primary object is to provide improvements in tank-equipped vehicles of the character stated to the end that the forces tending to distort the bottom plate portion of the tank will be resisted to the maximum degree, the tank will be stiffened in a direction lengthwise thereof, the cost of constructing the tank cars will be reduced, the use of plates at the inner sides of the tank at the connections between the tank and the members connecting the latter with the underframe, may be dispensed with, and other objects as will be manifest from the following description.

Referring to the accompanying drawings which illustrate my invention as embodied in a combined tender and tank car:—

Figure 1 is a view in side elevation of the tender and tank car. Figure 2 is a plan view thereof. Figure 3 is a plan view of one end of the underframe of the car. Figure 4 is a similar view of the other end of the underframe, these two views, taken together, showing the entire underframe. Figure 5 is a view in side elevation of the portion of the underframe shown in Fig. 3. Figure 6 is a similar view of the portion of the underframe shown in Fig. 4; and Figure 7, an enlarged broken sectional view taken at the line 7 on Figs. 1 and 3 and viewed in the direction of the respective arrows.

The structure shown comprises an underframe represented generally at 10 which extends the full length of the vehicle, this frame being provided, adjacent its opposite ends, with body-bolster portions and intermediate these bolsters with cross-beam portions 12. The underframe 10 is mounted on wheeled trucks represented diagrammatically at 13, the underframe being supported at its body-bolsters 11 on the trucks 13 in accordance with common practice.

The tank portion of the car is represented at 14 and the coal-bunker thereof at 15, the tank being shown as extending at one end beneath the bunker and substantially the full length of the underframe. The combined tank and bunker structure is supported upon the underframe, to extend lengthwise thereof as shown, at concave seating surfaces provided on the upper surface of the underframe at intervals along the latter.

Extending along the tank at opposite sides thereof are members serving as reenforcements for the tank and for anchoring it in position on the underframe. In the particular construction shown, wherein the body-bolsters 11 are provided with upwardly arched portions 16 at their outer ends, each member referred to, which preferably extends substantially the entire length of the tank, is provided in sections longitudinally aligned and spaced apart at the arches 16, the reenforcing and anchoring means at each side of the tank, in the particular construction shown, comprising three such sections represented at 18, 19 and 20.

The sections 18, 19 and 20 of the reenforcing and anchoring members referred to are each preferably formed to provide a lower horizontally-disposed flange 21 at which these members are secured to the under-frame, as by riveting them thereto, and an upwardly and outwardly extending flange 22 connected with the flange 21 by a web section 23 and positioned to flatwise engage the side of the tank to which it is connected, as by the rivets 24, the members referred to being preferably formed of two angle members 25 and 26 connected together at opposed vertical flanges thereof, as by rivets 27.

The sections 18 of these members preferably extend, as shown, from a point adjacent one of the body-bolsters 16 to a point adjacent the other thereof, overlying the ends of these bolsters and the outer ends of the cross-beams 12 to which they are riveted, as represented at 11ᵃ and 12ᵃ, respectively. The end sections 19 and 20 of the reenforcing and anchoring members overlie the ends of the body bolsters and apertured seating portions 28 at the ends of the underframe and are riveted thereto as represented at 11ᵇ and 28ᵃ, respectively.

It will be understood that especially in the case of the utilization of the invention in a structure wherein the arches 16 are omitted, the reenforcing and anchoring members at the opposite sides of the tank may be continuous, if desired, instead of being provided in sections extending in series lengthwise of the tank.

By constructing a vehicle in accordance with my invention, the tank is stiffened in a direction lengthwise thereof and distortion of the bottom plate portion of the tank, under great loads, and in the shifting of the liquid in the tank, is prevented by reason of the fact that the forces to which such plate portion is subjected are distributed along the tank, instead of being localized at more or less remote points along the tank and underframe. Furthermore, the use of plates at the inside of the tank for engagement with the rivets holding the anchoring means in place, as are required to be used in structures as hitherto provided, is rendered unnecessary, thereby reducing the cost of construction.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. A tank-equipped vehicle comprising an underframe, a tank on said underframe, and a member extending along a side of the tank throughout the greater portion of the length of the latter and located laterally remote from the central portion of the underframe, and rigidly connected with both said tank and underframe and serving to reenforce the tank and anchor it to the underframe.

2. A tank-equipped vehicle comprising an underframe, a tank on said underframe, and members extending along the tank at its opposite sides and throughout the greater portion of the length of the latter and located laterally remote from the central portion of the underframe, and rigidly connected both with said tank and underframe and serving to reenforce the tank and anchor it to the underframe.

3. A tank-equipped vehicle comprising an underframe having cross-beam portions, a tank on said underframe and a tank-reenforcing-and-anchoring member extending along a side of said tank and continuously from one cross-beam portion to another and connected with the side wall of the tank and to said cross-beam portions.

4. A tank-equipped vehicle comprising an underframe having cross-beam portions, a tank on said underframe, tank reenforcing-and-anchoring members extending along the tank at opposite sides thereof, each of said members extending continuously from one cross-beam portion to another thereof and connected with the side wall of the tank and to said cross-beam portions.

5. A tank-equipped vehicle comprising an underframe having body-bolsters adjacent its ends, a tank on said underframe and a member extending along a side of the tank laterally remote from the central portion of the underframe, and continuously from a point adjacent one of said body-bolsters to a point adjacent the other thereof and rigidly connected with both the side wall of the tank and underframe.

6. A tank-equipped vehicle comprising an underframe having body-bolsters adjacent its ends, a tank on said underframe, and members extending along the tank at opposite sides thereof laterally remote from the central portion of the underframe, each of said members extending continuously from a point adjacent one of said body-bolsters to a point adjacent the other thereof and rigidly connected with both the side wall of the tank and underframe.

7. A tank-equipped vehicle comprising an underframe having body-bolsters adjacent its opposite ends and cross-beam portions intermediate said bolsters, a tank on said underframe, and a member extending along a side of the tank and continuously from a point adjacent one of said body-bolsters to a point adjacent the other thereof and connected with the side wall of the tank and with said cross-beam portions.

8. A tank-equipped vehicle comprising an underframe having body-bolsters adjacent its opposite ends and cross-beam portions intermediate said bolsters, a tank on said underframe, and members extending along the tank at opposite sides thereof, each of said members extending continuously from a point adjacent one of said body-bolsters to a point adjacent the other thereof and connected with the side wall of the tank and with said cross beam portions.

ROBERT R. WEAVER.